United States Patent
Gunasekaran et al.

(10) Patent No.: US 11,220,466 B2
(45) Date of Patent: Jan. 11, 2022

(54) SKINNING OF CERAMIC HONEYCOMB BODIES

(71) Applicant: CORNING INCORPORATED, Corning, NY (US)

(72) Inventors: Natarajan Gunasekaran, Painted Post, NY (US); Mallanagouda Dyamanagouda Patil, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 17/071,652

(22) Filed: Oct. 15, 2020

(65) Prior Publication Data

US 2021/0024429 A1 Jan. 28, 2021

Related U.S. Application Data

(60) Continuation of application No. 15/834,882, filed on Dec. 7, 2017, now Pat. No. 10,807,914, which is a (Continued)

(51) Int. Cl.
*C04B 38/00* (2006.01)
*C04B 28/24* (2006.01)
(Continued)

(52) U.S. Cl.
CPC ...... *C04B 38/0006* (2013.01); *B01D 46/0001* (2013.01); *B01D 46/2444* (2013.01); *B28B 19/0038* (2013.01); *C04B 28/24* (2013.01); *C04B 35/195* (2013.01); *C04B 41/009* (2013.01); *C04B 41/4505* (2013.01);
(Continued)

(58) Field of Classification Search
None
See application file for complete search history.

(56) References Cited

U.S. PATENT DOCUMENTS 6,227,699 B1 5/2001 Wight, Jr.
6,623,704 B1 9/2003 Roth
(Continued)

FOREIGN PATENT DOCUMENTS

CN 1883806 A 12/2006
CN 101850203 A 10/2010
(Continued)

OTHER PUBLICATIONS

English Translation of CN201580025547.X First Office Action dated Dec. 3, 2018, China Patent Office, 11 Pgs.
(Continued)

*Primary Examiner* — Barbara J Musser
(74) *Attorney, Agent, or Firm* — Kurt R. Denniston

(57) ABSTRACT

A ceramic honeycomb body having a skin that does not block partial cells extending from an inlet face to an outlet face at an outer periphery portion of the body. A method of making the ceramic honeycomb body having the skin includes disposing a sheet on an outer peripheral wall of a honeycomb core having an outer surface spaced apart from interiors of the partial cells and skinning the body having the sheet disposed thereon. Subsequent curing in the method bonds the skin to cell walls of the body spaced apart from interiors of the partial cells.

14 Claims, 9 Drawing Sheets

Related U.S. Application Data division of application No. 14/217,629, filed on Mar. 18, 2014, now Pat. No. 9,862,650.

(51) Int. Cl.

| | |
|---|---|
| C04B 35/195 | (2006.01) |
| C04B 41/85 | (2006.01) |
| C04B 41/00 | (2006.01) |
| C04B 41/50 | (2006.01) |
| B01D 46/00 | (2006.01) |
| B01D 46/24 | (2006.01) |
| B28B 19/00 | (2006.01) |
| C04B 41/81 | (2006.01) |
| C04B 41/89 | (2006.01) |
| C04B 41/45 | (2006.01) |
| C04B 111/00 | (2006.01) |

(52) U.S. Cl.
CPC ...... *C04B 41/4535* (2013.01); *C04B 41/5089* (2013.01); *C04B 41/81* (2013.01); *C04B 41/85* (2013.01); *C04B 41/89* (2013.01); *C04B 2111/0081* (2013.01); *C04B 2111/00793* (2013.01); *Y10T 428/24149* (2015.01)

(56) References Cited

U.S. PATENT DOCUMENTS

| | | |
|---|---|---|
| 6,824,749 B2 | 11/2004 | Leloup et al. |
| 7,186,310 B2 | 3/2007 | Yamaguchi et al. |
| 7,585,569 B2 | 9/2009 | Carre et al. |
| 7,727,613 B2 | 6/2010 | Suwabe et al. |
| 7,745,363 B2 | 6/2010 | Beall et al. |
| 7,976,769 B2 | 7/2011 | Fletcher et al. |
| 8,007,731 B2 | 8/2011 | Berkey et al. |
| 8,241,725 B2 | 8/2012 | Hiramatsu et al. |
| 8,278,236 B2 | 10/2012 | Pfeifer et al. |
| 8,454,886 B2 | 6/2013 | Faber et al. |
| 9,089,992 B2 | 7/2015 | Domey et al. |
| 9,447,716 B2 | 9/2016 | Nakatani |
| 2005/0210848 A1 | 9/2005 | Kuki et al. |
| 2006/0083935 A1 | 4/2006 | Carre et al. |
| 2006/0121240 A1 | 6/2006 | Hirai et al. |
| 2007/0004592 A1 | 1/2007 | Ohno et al. |
| 2007/0186911 A1 | 8/2007 | Gerlach et al. |
| 2008/0124504 A1 | 5/2008 | Faber et al. |
| 2008/0220203 A1 | 9/2008 | Ichikawa et al. |
| 2008/0268200 A1 | 10/2008 | Domey et al. |
| 2009/0286041 A1 | 11/2009 | Deneka et al. |
| 2010/0055332 A1 | 3/2010 | Domey et al. |
| 2010/0247851 A1 | 9/2010 | Miyata et al. |
| 2010/0304041 A1 | 12/2010 | Fletcher et al. |
| 2011/0262691 A1 | 10/2011 | Naruse et al. |
| 2012/0100336 A1 | 4/2012 | Cai et al. |
| 2012/0207967 A1 | 8/2012 | Pyzik et al. |
| 2012/0263914 A1 | 10/2012 | Cai et al. |
| 2012/0301664 A1 | 11/2012 | Chapman et al. |
| 2013/0136866 A1 | 5/2013 | Anthony et al. |
| 2013/0149458 A1* | 6/2013 | Cai .................. C04B 41/87 427/458 |
| 2013/0224430 A1 | 8/2013 | Chapman et al. |
| 2013/0255854 A1 | 10/2013 | Ogawa et al. |
| 2015/0040763 A1 | 2/2015 | O'Brien et al. |

FOREIGN PATENT DOCUMENTS

| | | |
|---|---|---|
| CN | 102471173 A | 5/2012 |
| CN | 102847560 A | 1/2013 |
| CN | 103011903 A | 4/2013 |
| EP | 0042302 A1 | 12/1981 |
| EP | 0597237 A2 | 5/1994 |
| EP | 1580181 A2 | 9/2005 |
| EP | 2383087 A2 | 11/2011 |
| EP | 2644343 A2 | 10/2013 |
| JP | 2003-148127 A | 5/2003 |
| JP | 2005-270755 A | 10/2005 |
| JP | 2007-528342 A | 10/2007 |
| JP | 2008-043851 A | 2/2008 |
| JP | 2008-505743 A | 2/2008 |
| JP | 2009-214098 A | 9/2009 |
| JP | 4998346 B2 | 8/2012 |
| JP | 2012-250901 A | 12/2012 |
| JP | 5255626 B2 | 8/2013 |
| JP | 2013-212493 A | 10/2013 |
| JP | 2013-227191 A | 11/2013 |
| WO | 2007/091688 A1 | 8/2007 |
| WO | 2013/015932 A1 | 1/2013 |
| WO | 2013/048850 A1 | 4/2013 |
| WO | 2013/090214 A2 | 6/2013 |
| WO | 2013/162814 A1 | 10/2013 |

OTHER PUBLICATIONS

English Translation of JP2016557992 Office Action dated Sep. 26, 2018; 4 Pages; Japanese Patent Office.

http://www.adhesiveandglue.com/thermoset.html retrieved Apr. 29, 2016, web page.

International Preliminary Report on Patentability of the International Searching Authority; PCT/US15/20920; dated Sep. 29, 2016; 11 Pages; European Patent Office.

International Search Report and Written Opinion of the International Searching Authority; PCT/US15/20920; dated Jun. 16, 2015; 15 Pages; European Patent Office.

Japanese Patent Application No. 2016557992; Notice of Allowance dated Oct. 16, 2019; Japan Patent Office; 3 Pgs.

Kaiser A. et al., "Comparison of Different Shaping Technologies for Advanced Ceramics Production", Process Engineering, cfi/Ber. DKG, 86 (2009), No. 4, pp. E41-E48.

Machine translation of JP 2008043851A (translated Sep. 27, 2019) (Year: 2008).

Japanese Patent Application No. 2019-163617, Office Action dated Nov. 18, 2020, 9 pages (4 pages of English Translation Only and 5 pages of Original Document); Japanese Patent Office.

* cited by examiner

SKINNING OF CERAMIC HONEYCOMB BODIES

This is a continuation application of U.S. patent application Ser. No. 15/834,882 filed on Dec. 7, 2017, Now U.S. Pat. No. 10,807,914 which claims the benefit of priority to U.S. patent application Ser. No. 14/217,629 filed on Mar. 18, 2014, now U.S. Pat. No. 9,862,650 the contents of which are relied upon and incorporated herein by reference in their entireties.

BACKGROUND

Field

Exemplary embodiments of the present disclosure relate to skinning of honeycomb bodies and, more particularly, to skinned honeycomb bodies having open peripheral partial cells and methods of manufacturing the same.

Discussion of the Background

After-treatment of exhaust gas from internal combustion engines may use catalysts supported on high-surface area substrates and, in the case of diesel engines and some gasoline direct injection engines, a catalyzed filter for the removal of carbon soot particles. Filters and catalyst supports in these applications may be refractory, thermal shock resistant, stable under a range of $pO_2$ conditions, non-reactive with the catalyst system, and offer low resistance to exhaust gas flow. Porous ceramic flow-through honeycomb substrates and wall-flow honeycomb filters (generically referred to herein as honeycomb bodies) may be used in these applications.

Particulate filters and substrates may be difficult to manufacture to external dimensional requirements set by original equipment manufacturers (OEMs) and the supply chain due to drying and firing shrinkage during manufacturing. Consequently, ceramic cement may be used to form an exterior skin of a honeycomb body which has been machined or "contoured" to a desired dimension. As used herein, the term "honeycomb body" includes single honeycomb monoliths and honeycomb bodies formed by multiple honeycomb segments that are secured together, such as by using a ceramic cement to form a monolith. Ceramic cement may be mixed and applied to a fired, contoured or segmented honeycomb body and the wet skin allowed to dry. The act or process of applying ceramic cement to the exterior of the honeycomb body is referred to herein as "skinning" the honeycomb body. A honeycomb body having skin disposed thereon is referred to herein as a "skinned" honeycomb body. As disclosed herein, contouring refers to grinding, machining, cutting, drilling, core drilling, etc. to a desired dimension.

The above information disclosed in this Background section is only for enhancement of understanding of the background of the disclosure and therefore it may contain information that does not form any part of the prior art nor what the prior art may suggest to a person of ordinary skill in the art.

SUMMARY

Exemplary embodiments of the present disclosure provide skinned honeycomb bodies having open partial channels extending from an inlet face to an outlet face at an outer peripheral portion.

Exemplary embodiments of the present disclosure also provide a method of manufacturing the skinned honeycomb bodies having open partial cell channels extending from an inlet face to an outlet face at an outer peripheral portion.

Additional features of the disclosure will be set forth in the description which follows, and in part will be apparent from the description, or may be learned by practice of the disclosure.

An exemplary embodiment discloses a honeycomb body. The body includes a honeycomb core having a plurality of channel walls extending from an inlet face to an outlet face defining cell channels therebetween, an outer periphery extending from the inlet face to the outlet face, and partial cell channels adjoining the outer periphery of the honeycomb core, wherein channel walls of each partial channel comprise a gap at the outer periphery of the honeycomb core and each partial cell channel comprises a volume from the inlet face to the outlet face being enclosed by the channel walls and the gap at the honeycomb core periphery. The ceramic article includes a skin disposed on the outer periphery of the honeycomb core across the gaps such that a majority of the total partial cell channel volume is open from the inlet face to the outlet face.

An exemplary embodiment also discloses a method of manufacturing a honeycomb body. The method includes disposing a sheet on an outer peripheral surface of a honeycomb core, wherein the outer peripheral surface extends from a first end face to a second end face of the honeycomb core, disposing skin batch on the sheet, and curing the skin batch to bond the cured skin to the honeycomb core to form the honeycomb body. In the method, curing comprises sacrificing at least a portion of the sheet and the cured skin forms an outer wall of a portion of peripheral partial cell channels open from the first end face to the second end face.

It is to be understood that both the foregoing general description and the following detailed description are exemplary and explanatory and are intended to provide further explanation of the disclosure.

BRIEF DESCRIPTION OF THE FIGURES

The accompanying drawings, which are included to provide a further understanding of the disclosure and are incorporated in and constitute a part of this specification, illustrate exemplary embodiments of the disclosure, and together with the description serve to explain the principles of the disclosure.

DETAILED DESCRIPTION

Figure 1A:
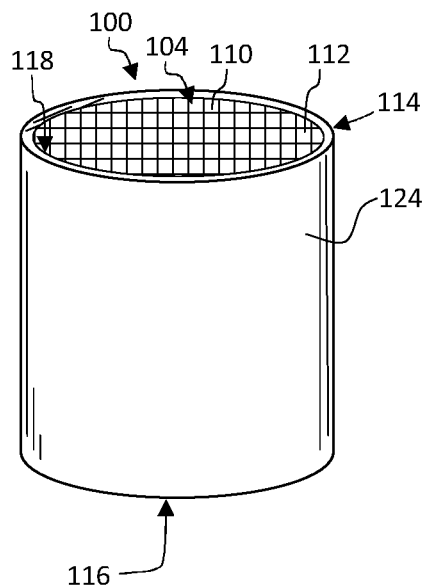
FIG. 1A shows a schematic perspective view of a honeycomb body comprising a skin on an outer periphery of a honeycomb core not filling partial cells thereof according to exemplary embodiments of the disclosure.

The disclosure is described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these embodiments are provided so that this disclosure is thorough, and will fully convey the scope of the disclosure to those skilled in the art. In the drawings, the size and relative sizes of layers and regions may be exaggerated for clarity.

It will be understood that when an element or layer is referred to as being "on", "connected to", or "adjacent to" another element or layer, it can be directly on, directly connected to, or directly adjacent to the other element or layer, or intervening elements or layers may be present. In contrast, when an element or layer is referred to as being "directly on", "directly connected to", or "directly adjacent to" another element or layer, there are no intervening elements or layers present. Like reference numerals in the drawings denote like elements. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

In these exemplary embodiments, the disclosed article, and the disclosed method of making the article provide one or more advantageous features or aspects, including for example as discussed below. Features or aspects recited in any of the claims are generally applicable to all facets of the disclosure. Any recited single or multiple feature or aspect in any one claim can be combined or permuted with any other recited feature or aspect in any other claim or claims.

While terms such as, top, bottom, side, upper, lower, vertical, and horizontal are used, the disclosure is not so limited to these exemplary embodiments. Instead, spatially relative terms, such as "top", "bottom", "horizontal", "vertical", "side", "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, employed in describing the embodiments of the disclosure, refers to variation in the numerical quantity that can occur, for example: through typical measuring and handling procedures used for preparing materials, compositions, composites, concentrates, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

The indefinite article "a" or "an" and its corresponding definite article "the" as used herein means at least one, or one or more, unless specified otherwise.

Abbreviations, which are well known to one of ordinary skill in the art, may be used (e.g., "h" or "hr" for hour or hours, "g" or "gm" for gram(s), "mL" for milliliters, and "RT" for room temperature, "nm" for nanometers, and like abbreviations).

Specific and preferred values disclosed for components, ingredients, additives, times, temperatures, pressures, and like aspects, and ranges thereof, are for illustration only; they do not exclude other defined values or other values within defined ranges. The apparatus, and methods of the disclosure can include any value or any combination of the values, specific values, more specific values, and preferred values described herein.

As used herein, a green material is an unfired material comprising a mixture of inorganic and/or organic materials.

The green material may include various inorganic filler materials, inorganic and/or organic binder materials, and liquid vehicle. The green material may be dried to remove fluid content (e.g. water). Drying is often accomplished by allowing a part to sit exposed to the ambient atmosphere overnight, however, hot air, forced air, microwave, radio frequency (RF) or infrared radiation (IR) may be used to augment drying. The drying may be accomplished in humidity controlled air. Green material may include cold-set cements. The dried green material may be fired to form a porous or non-porous ceramic article.

As used herein, a "super addition" refers to a weight percent of a component, such as, for example, an organic binder, liquid vehicle, additive or pore former, based upon and relative to 100 weight percent of the inorganic components of the mixture.

Substrate and filter articles are used in gasoline and diesel, light duty and heavy duty vehicles for after treatment emission control, and which control satisfies environmental regulations. One of the steps in the production of these substrates and filters is the application of a cement-based skin or outer wall on the outer peripheral axial surface of the substrates and filters.

The skin on a part, such as a porous ceramic filter article, is the interface between the part and the surroundings. The skin serves several advantageous functions, for example, the skin adds to the aesthetics of the part and is valued by customers as an indicator of quality, protects the part's functional filter portion from structural degradation such as chipping damage, and other hazards surrounding the part, in manufacture and use, such as in handling and transport of the part, and adds to the isostatic strength of the part, which is a significant performance metric for modern parts.

Figure 1B:
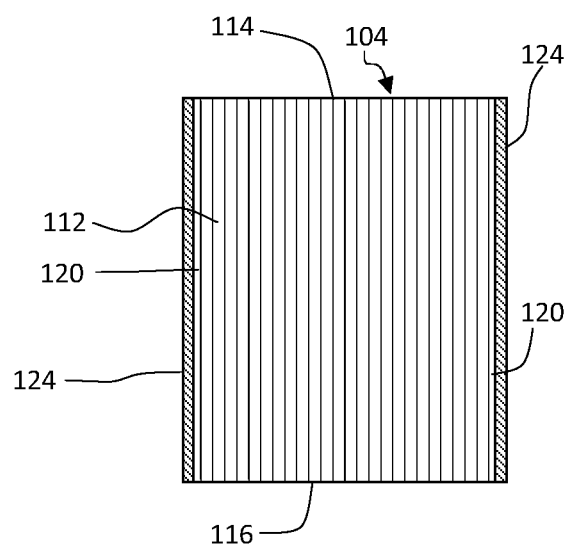
FIG. 1B is a schematic cross section through the honeycomb body of FIG. 1A according to these exemplary embodiments of the disclosure.
Figure 1C:
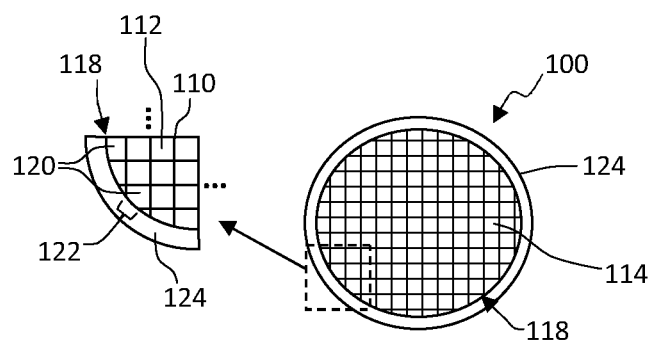
FIG. 1C is a schematic top view of the honeycomb body of FIG. 1A according to these exemplary embodiments of the disclosure.

FIG. 1A shows a honeycomb body 100 including a plurality of intersecting walls 110 that form mutually adjoining cell channels 112 extending axially between opposing end faces 114, 116. FIG. 1B shows a schematic cross section through the honeycomb body 100 of FIG. 1A. FIG. 1C shows a schematic top view of the honeycomb body 100 of FIG. 1A. "Cell" is generally used herein when referring to intersecting walls in cross section of the honeycomb body and "channel" is generally used when referring to a cell extending between the end faces 114, 116. Cell and channel may be used interchangeably as well as "cell channel". A "partial cell" or "partial cell channel" 120 when used herein refers to a cell or channel at the outer periphery 118 of a contoured honeycomb body 100 (honeycomb core 104) having a gap 122 in intersecting walls 110. The top face 114 refers to the first end face and the bottom face 116 refers to the second end face of the honeycomb body 100 positioned in FIG. 1A, otherwise the end faces are not limited by the orientation of the honeycomb body 100. The top face 114 may be an inlet face and the bottom face 116 may be an outlet face of the honeycomb body 100 or the top face 114 may be an outlet face and the bottom face 116 may be an inlet face of the honeycomb body 100.

Cell density can be between about 100 and 900 cells per square inch (cpsi). Typical cell wall thicknesses can range from about 0.025 mm to about 1.5 mm (about 1 to 60 mil). For example, honeycomb body 100 geometries may be 400 cpsi with a wall thickness of about 8 mil (400/8) or with a wall thickness of about 6 mil (400/6). Other geometries include, for example, 100/17, 200/12, 200/19, 270/19, 600/4, 400/4, 600/3, and 900/2. As used herein, honeycomb body 100 is intended to include a generally honeycomb structure but is not strictly limited to a square structure. For example, hexagonal, octagonal, triangular, rectangular or any other suitable cell shape may be used. Also, while the cross section of the cellular honeycomb body 100 is circular, it is not so limited, for example, the cross section can be elliptical, square, rectangular, or other desired shape.

Figure 2:
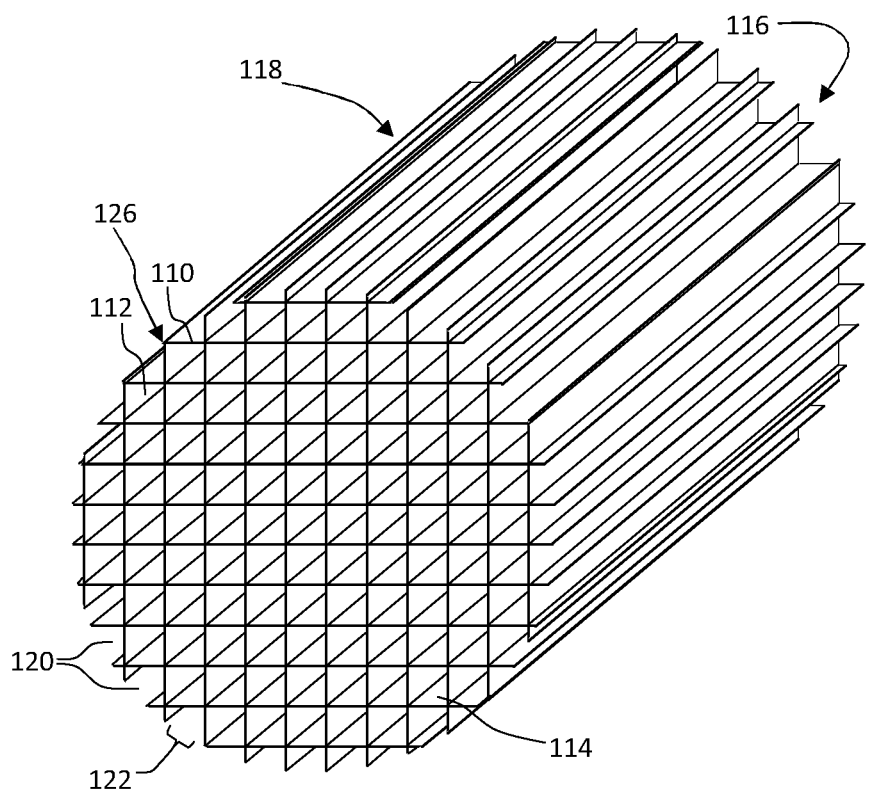
FIG. 2 shows a schematic perspective view of a honeycomb core comprising partial cells on an outer periphery thereof in a method according to exemplary embodiments of the disclosure.

The honeycomb body 100 generally has a honeycomb core 104 having an outer periphery 118 and a skin 124. The skin 124 may be co-extruded or applied after a contouring operation. FIG. 2 shows a perspective view of an exemplary embodiment of a honeycomb core 104 after contouring and before skinning. The honeycomb core 104 may be green and dried before contouring and skinning or may be fired. The walls 110 at the outer most periphery 118 of the contoured honeycomb core 100 may form partial cells 120 as well as cells 112. The partial cells 120 are generally spaced outward from the cells 112. However, a cell 112 may be outer most when walls 110 forming the cell 112 meet at the outer periphery 118. The outer most portions of the walls 110 of the partial cells 120 and the outer most corner 126 of some cells 112 form the outer periphery 118 of the contoured honeycomb core 104.

Exemplary embodiments of the disclosure relate to ceramic articles having a honeycomb core 104 such as shown in FIG. 2, which may be formed of a single monolith or formed of segments cemented together to form a monolith. The honeycomb core 104 includes a plurality of channel walls 110 extending from an inlet face 114 to an outlet face 116 defining cell channels 112 and partial cell channels 120 therebetween, an outer periphery 118 extending from the inlet face 114 to the outlet face 116, where partial cell channels 120 adjoin the outer periphery 118 of the honeycomb core 104. A skin 124 is disposed on the outer periphery 118 of the honeycomb core 104 such that a majority of the total partial cell channel volume is open from the inlet face 114 to the outlet face 116 as shown in FIGS. 1A, 1B, and 1C to form a honeycomb body 100. While this disclosure relates to after-applied skins, such after-applied skins may be disposed on co-extruded skins.

In these exemplary embodiments the honeycomb core 104 may be formed from a ceramic material, such as cordierite or in other cases may be made of other ceramic materials, such as silicon carbide, silicon nitride, aluminum titanate, alumina and/or mullite, or combinations thereof.

The honeycomb body can be formed according to any conventional process suitable for forming honeycomb monolithic bodies. For example, a plasticized ceramic forming batch composition can be shaped into a green body by any known conventional ceramic forming process, such as extrusion, injection molding, slip casting, centrifugal casting, pressure casting, dry pressing and the like. Typically, honeycomb structures are formed by an extrusion process where a ceramic material is extruded into a green form before the green form is fired to form the final ceramic structure. In an exemplary embodiment, the extrusion can be performed using a hydraulic ram extrusion press, a two stage de-airing single auger extruder or a twin screw mixer with a die assembly attached to the discharge end. The extruded material can be cut to create honeycomb structures such as filter bodies shaped and sized to meet the needs of engine manufacturers. The extruded material can be honeycomb segments connected or bonded together to form the honeycomb structures. These extruded green bodies can be any size or shape.

Generally, as a ceramic honeycomb structure is extruded, a solid external surface is provided along the length of the structure. Under certain circumstances, however, it may become necessary to remove the external surface. For example, a green extruded honeycomb structure may be shaped to a desired shape and size by removing the extruded external surface. Alternatively, the green honeycomb structure may be fired and then ground to the desired shape and size by removing the external extruded surface and any portion of the porous wall structure necessary to attain the desired shape and size. Shaping can be accomplished by any means known in the art, including cutting, sanding or grinding away the outer extruded surface of the honeycomb structure to achieve the desired shape and size.

Likewise, honeycomb segments may be shaped to a desired shape and size by removing the extruded external surface before integrating to the honeycomb structure. Alternatively, the honeycomb segments may be integrated to form a honeycomb structure and the formed honeycomb structure shaped to the desired shape and size.

Once the desired shape and size has been attained, a skin material can be applied to an outer periphery of the sized body to form a new external surface, or skin, on the body. Typically, the ends of the honeycomb body are not covered with the skin material, although certain passages may be plugged if desired. Once the skin composition has been applied to the honeycomb structure, the skin composition can be dried and/or calcined. In some embodiments a cold-set cement composition may be applied to the honeycomb structure. In some embodiments, the honeycomb core over which the cement is applied comprises fired ceramic material. In other embodiments, the honeycomb core comprises a green body or a calcined body. In some cases, final firing of the calcined honeycomb structure can take place during the catalyzation process.

Figure 3A:
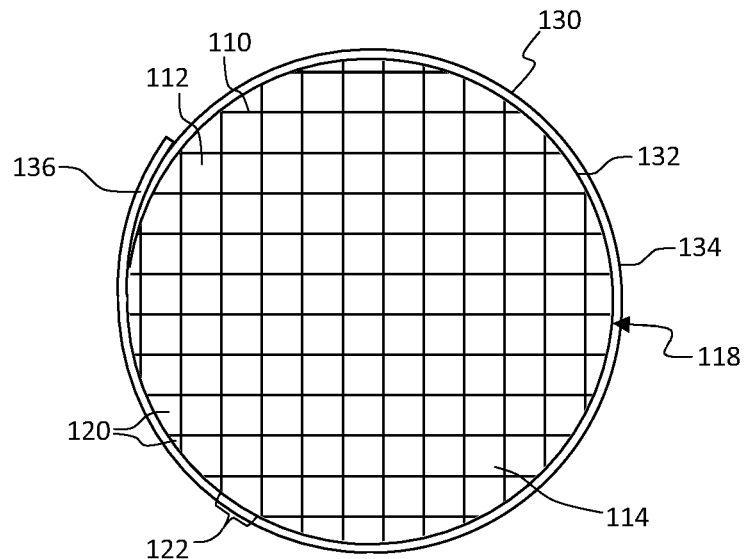
FIG. 3A shows an end view of the honeycomb core comprising partial cells on an outer periphery thereof shown in FIG. 2 having a sheet disposed on the outer periphery in a method according to these exemplary embodiments of the disclosure.

In these exemplary embodiments once the desired shape and size of the honeycomb core has been attained, a sheet is disposed on the honeycomb core and a skin batch is disposed on the sheet. FIG. 3A is a schematic end view of a honeycomb core 104 having a sheet 130 disposed on the outer periphery 118. The sheet has an inner surface 132 and an outer surface 134. The inner surface 132 is disposed on the outer periphery 118 such as by a wrapping operation in which the sheet inner surface 132 may overlap the sheet outer surface 134 at an overlap portion 136. Alternatively, the sheet 130 may be in the form of a sleeve with no overlap portion. When the sheet 130 is in the form of a sleeve, applying the sheet 130 to the honeycomb core 104 may include an operation where the sheet 130 may slide over an end face 114, 116 of the honeycomb core 104 to be disposed on the outer periphery 118.

Figure 3B:
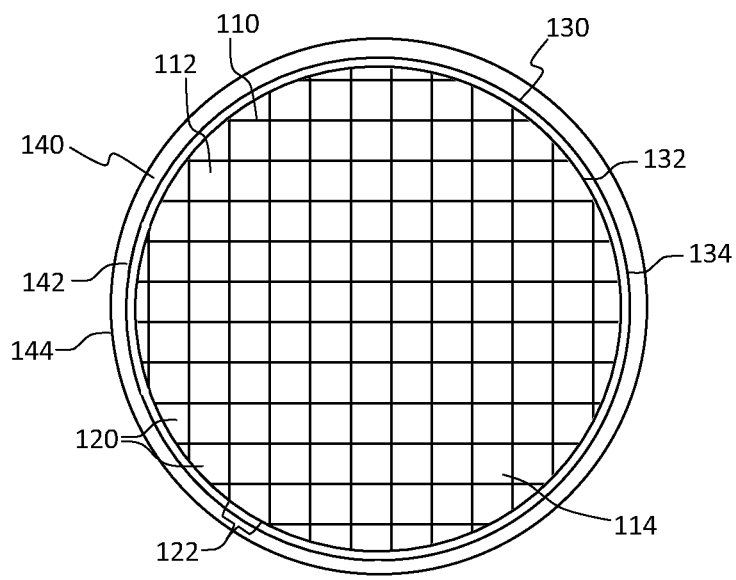
FIG. 3B shows an end view of the honeycomb core comprising partial cells on an outer periphery thereof shown in FIG. 3A having a skin batch disposed on the sheet disposed on the outer periphery in a method according to these exemplary embodiments of the disclosure.

The sheet 130 can be disposed on the outer most portions of the walls 110 of partial cells 120 and outer most corners 126 of cells 112 that form the outer periphery 118 of the contoured honeycomb core 104. The sheet 130 provides a barrier to prevent skin batch from filling partial cells 120. FIG. 3B shows a schematic end view of a honeycomb core 104 having a sheet 130 disposed on the outer periphery 118 and a layer of skin batch 140 disposed on the outer surface 134 of the sheet 130. The layer of skin batch 140 has an inner surface 142 contacting the outer surface 134 of the sheet 130 and an outer surface 144 forming the outer periphery of the honeycomb body 100.

The skin batch can be applied to the honeycomb core 104 shrouded in the sheet 130 by a doctor blade operation, by an axial skinning operation, by a spray casting operation, by a tape casting operation, or the like. The sheet 130 prevents the layer of skin batch 140 from filling the partial cells 120, however, the skin batch may penetrate the sheet 130 to contact the outer most portions of the walls 110 of the partial cells 120 and the outer most corner 126 of some cells 112 that form the outer periphery 118 of the contoured honeycomb core 104. In this sense, the sheet 130 may be porous to allow skin batch to contact the honeycomb core walls 110. The skin batch contacting the honeycomb core walls 110 bonds the skin batch layer 140 to the honeycomb core 104 when the skin batch is cured forming the honeycomb body. Curing the skin batch may include sacrificing the sheet 130. For example, the skin batch may be fired or calcined to form an outer skin and burning off the sheet 130 leaving a portion of the skinned partial cell channels 120 open from the inlet face 114 to the outlet face 116.

The sheet 130 may be wetted, for example, with water, or the sheet 130 may comprise a constituent of the skin 124. Wetting the sheet 130 may facilitate disposing the sheet 130 on the honeycomb core 104. Wetting and drying the sheet 130 can shrink the sheet 130 to the honeycomb core 104 further facilitating subsequent skinning operations. The sheet 103 impregnated with one or more constituents of the skin 124 or skin layer 140 may enhance bonding of the skin 124 to the honeycomb core 104 while preventing defects such as cracks and the like. One such constituent may be an inorganic binder such as colloidal silica, colloidal alumina, or the like, and combinations thereof.

In exemplary embodiments the sheet 130 can be at least one of a porous woven sheet, a porous non-woven sheet, a non-porous woven sheet, and a non-porous non-woven sheet. The sheet is not particularly limited and can include, natural and synthetic materials, the sheet may be adhesive backed or non-adhesive backed. Examples of sheet materials include glass fiber tape, glass fiber cloth, cellulose fiber, polymers such as polyethelene fiber cloth, nylon fiber cloth, and polyester fiber cloth, other examples of sheet material include carbon fiber fabric, paper, paper tissue, such as Kimwipe®, mesh, natural fiber cloth, such as cotton, silk, hemp, or linen, and the like. Porosity can be in a range from nanometer scale to millimeter scale. The sheet thickness can be in a similar range, for example, from microns to millimeters. For example, the sheet thickness can be about 50 to 1500 µm and the pore openings can be from about 1 µm to about 1500 µm. When the sheet 130 is porous, constituents of the skin batch can penetrate the sheet 130 and bond the skin layer 140 to the honeycomb core 104. When the sheet 130 is non-porous, constituents of the skin layer may penetrate the sheet 130 during calcining or curing to allow the skin material layer 140 to bond to the honeycomb core 104 outer periphery 118. When the sheet 130 is non-porous, the sheet 130 may react during calcining, firing, or curing to allow the skin material layer 140 to bond to the honeycomb core 104 outer periphery 118.

As another non-limiting method of characterizing sheet parameters, sheet density may be used. For example, the sheet can have a density from about 0.1 oz/sq yd to about 50 oz/sq yd. For example, the sheet material may be about 0.7 oz/sq yd, about 1.5 oz/sq yd, about 2 oz/sq yd, about 2.7 oz/sq yd, or even about 3.2 oz/sq yd.

In an alternative exemplary embodiment, the skin batch layer 140 may be disposed on the sheet 130 prior to the operation of disposing the sheet 130 on the honeycomb core 104. In such an instance, the sheet 130 having the batch layer 140 disposed on the outer surface 134 can be applied to the honeycomb core 104 as described above.

The sheet 130 may have a layer of skin batch disposed on the sheet inner surface 132 prior to disposing the sheet 130 on the outer periphery 118. The sheet 130 prevents the layer of skin batch disposed on the inner surface 132 from filling the partial cells 120. The skin batch on the inner surface 132 contacting the honeycomb core walls 110 bonds the skin batch layer 140 to the honeycomb core 104 when the skin batch is cured forming the honeycomb body 100. In this exemplary embodiment, the sheet 130 may be sacrificed or transformed during curing, firing, or calcination to form the outer skin 124. When skin batch cement is disposed on the inner surface 132 and the outer surface 134, the batch cement can comprise the same composition on the inside and outside of the sheet 130 or batch cements can comprise different compositions on the inside and outside of the sheet. For example, for the skin 124 to match desired physical properties (elastic modulus (EMOD), coefficient of thermal expansion (CTE), modulus of rupture (MOR), and the like) of the honeycomb core 104, a first composition can be applied to the inner surface 132 and for desired physical properties of the outer surface of the skin 124 such as different MOR, EMOD, CTE, a second composition can be applied to the outer surface 134.

Figure 3C:
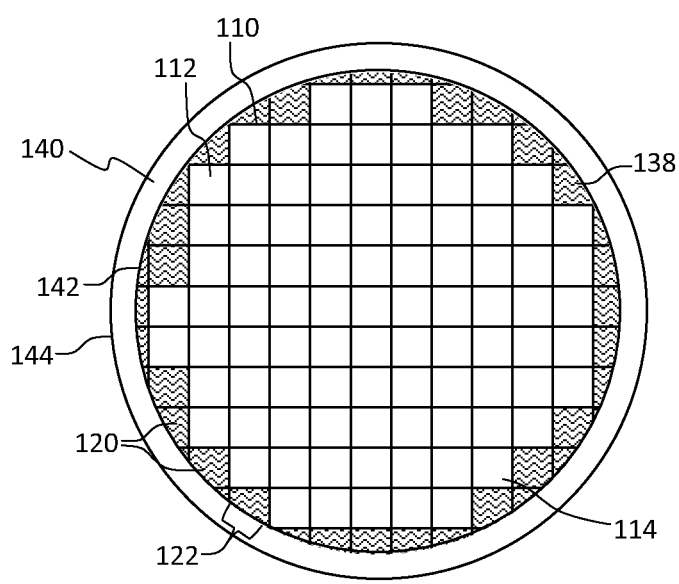
FIG. 3C shows an end view of the honeycomb core comprising partial cells on an outer periphery thereof shown in FIG. 2 having a skin batch disposed on a filling material disposed on the outer periphery in a method according to these exemplary embodiments of the disclosure.

In an alternative embodiment, a filling material 138 can be disposed on the outer periphery 118 of the honeycomb core 104 to fill the partial cells 120 prior to applying a skin batch material (FIG. 3C). The filling material 138 may be applied in the partial cells 120 and cleaned away to expose the outer most portions of the walls 110 of the partial cells 120 and the outer most corner 126 of some cells 112 that form the outer periphery 118 of the contoured honeycomb core 104. In this way, when the skin batch is applied to the honeycomb structure 104 comprising the filling material 138, the skin batch may contact the outer most portions of the walls 110 of the partial cells 120 and the outer most corner 126 of some cells 112 that form the outer periphery 118 of the contoured honeycomb core 104. The skin batch contacting the honeycomb core walls 110 bonds the skin batch layer to the honeycomb core 104 when the skin batch is cured forming the honeycomb body 100. Curing the skin batch may include sacrificing the filling material 138. For example, the skin batch may be fired or calcined to form an outer skin 124 and burning off the filling material 138 leaving a portion of the skinned partial cell channels 120 open from the inlet face 114 to the outlet face 116.

The filling material 138 can comprise wax, naphthalene, and the like. The filling material 138 can be a paste at room temperature and volatilize at high temperature such as at drying, curing, calcining, or firing temperatures.

Once the skin material has been applied to the sheet 130 or the filling material 138 on the honeycomb structure in a manner as described herein, the skin material can be optionally dried and/or fired. The optional drying step can comprise first heating the skin material in a humidity controlled atmosphere at a temperature and for a period of time sufficient to at least substantially remove any liquid vehicle that may be present in the skin material. As used herein, at least substantially removing any liquid vehicle includes the removal of at least 95%, at least 98%, at least 99%, or even at least 99.9% of the liquid vehicle present in the skin material prior to firing. Exemplary and non-limiting drying conditions suitable for removing the liquid vehicle include heating the skin material at a temperature of at least 50° C., at least 60° C., at least 70° C., at least 80° C., at least 90° C., at least 100° C., at least 110° C., at least 120° C., at least 130° C., at least 140° C., at least 150° C., at least 160° C., at least 170° C., at least 180° C., at least 190° C., or even at least 200° C. In one embodiment, the conditions effective to at least substantially remove the liquid vehicle comprise heating the skin material in a humidity controlled atmosphere, such as air, at a temperature in the range of from 60° C. to 120° C. Further, the heating can be provided by any conventionally known method, including for example, hot air drying, RF and/or microwave drying in a humidity controlled atmosphere.

The optional firing step can include conditions suitable for converting the skin material to a primary crystalline phase ceramic composition include heating the honeycomb with applied skin material to a peak temperature of greater than 800° C., 900° C., and even greater than 1000° C. A ramp rate of about 120° C./hr during heating may be used, followed by a hold at the peak temperature for a temperature of about 3 hours, followed by cooling at about 240° C./hr.

Skin material disclosed herein can include those that set at a temperature of less than 200° C., such as a temperature of less than 100° C., and further such as a temperature of less than 50° C., including cement material that can be used in skinning processes employing "cold set" skins. In cold set skinning, only drying of the skinning mixture is required to form a seal of the channel walls of the honeycombs. When a cold set skinning process is employed, heating of the skinned honeycombs to temperatures in the 35-110° C. range can be useful to accelerate drying. In some cold set skinning processes, it is anticipated that final skin consolidation, including the removal of residual temporary binder bi-products such as the sheet 130 and strengthening of the seals, can occur in the course of subsequent processing steps (e.g., in the course of catalyzation or canning) or during first use (e.g., in an exhaust system).

For example, exemplary compositions in which cold set skinning may be employed include those comprising a refractory filler that comprises at least one inorganic powder, such as at least one of aluminum titanate, cordierite, fused silica, mullite, and alumina, the inorganic powder having a bimodal or mono sized median particle size ($D_{50}$) of from 15 to 50 microns, such as from 30 to 40 microns for mono sized and additionally a median particle size in a range from about 150 microns to about 300 microns, such as from about 150 microns to about 250 microns for the second particle size in bimodal size compositions, and a gelled inorganic binder, such as gelled colloidal silica. At least one gelling agent, such as at least one of hydrochloric acid, sulfuric acid, nitric acid, citric acid, and acetic acid, ammonium hydroxide, sodium hydroxide, and triethanol amine (hereinafter "TEA") may be added either before (e.g., as a pre-mix with the gelled inorganic binder) or during batching in order to gel the inorganic binder. Alternatively a non-gelled composition may be used. Such compositions can provide skins that set in a porous ceramic honeycomb body (and be thereby permanently sealed to the channel walls) at a temperature of less than 200° C., such as less than 100° C., and further such as less than 50° C., including about 25° C. Further non-limiting exemplary embodiments of cement compositions used for skinning are discussed below.

Skin compositions are described in U.S. Provisional Patent Application No. 61/602,883 and U.S. patent application Ser. No. 13/302,262, the contents of which are incorporated herein by reference in their entirety. According to exemplary embodiments the skin composition may be a single glass powder composition including a cement comprising a glass powder as a low thermal expansion filler material, a binder and a solvent or vehicle for carrying the solid constituents of the glass-based cement. The glass of the glass powder filler material may be an amorphous fused silica ($SiO_2$), ground cordierite, AT grog, or silica soot. The glass powder filler material can have a median particle size (D50) between 10 and 20 μm, with a minimum particle size between 7 μm and 75 μm and a maximum particle size between 50 μm and 70 μm. Particle size determined as a mass-based equivalent spherical diameter. The glass powder filler material may comprise, for example, from 60-80 wt. % of the total inorganic components of the cement. Suitable silica powder filler materials are available, for example, under the trade name Teco-Sil, available from CE Minerals of Tennessee Electro Minerals Incorporated, Tennessee, USA. All particle size measurements herein were made with a Microtrac Inc. particle size analyzer, unless otherwise indicated.

According to exemplary embodiments the skin composition may include an amorphous glass-based cement, the cement formed from a dual glass powder composition comprising a first (fine) glass powder as a low thermal expansion filler material, a second (coarse) glass powder as a low thermal expansion filler material, a binder and a solvent or vehicle for carrying the solid constituents of the glass-based cement. The glasses of both the first glass powder filler material and the second glass powder filler material may be amorphous fused silica having particle sizes greater than about 1 μm. The distribution of glass powder filler material particle size can be multimodal in that a distribution of the glass powder filler material with particle sizes greater than about 1 μm exhibits multiple modes (local maximums) of particle sizes. In one embodiment, the amorphous glass-based cement comprises a bimodal particle size distribution of amorphous glass particles with a particle size greater than about 1 μm. The glass based cement may include a first glass powder filler material wherein a median (D50) particle size of the first glass powder filler material can be in a range from about 10 to about 50 μm, from about 15 μm to about 50 μm, from about 20 μm to about 45 μm or from about 30 μm to about 45 μm, with a D10 in a range from about 1 μm to about 10 μm and D90 in a range from about 25 μm to about 125 μm. A median (D50) particle size of the second glass powder filler material can be in a range from about 150 μm to about 300 μm, in a range from about 150 μm to about 250 μm, in a range from about 170 μm to about 230 μm, in a range from about 180 μm to about 220 μm, with D10 in a range from about 100 μm to about 150 μm, and D90 in a range from about 250 μm to about 350 μm. Particle sizes are determined as a mass-based equivalent spherical diameter. As used herein, the term D50 represents the median of the distribution of particle sizes, D10 represents the particle size in microns for which 10% of the distribution are smaller than the particle size, and D90 represents the particle size in microns for which 90% of the distribution are smaller than the particle size. The dual glass based cement may contain, for example, an amount of the first glass powder filler material in a range from about 20 to about 60 wt. % of the total weight of the inorganic solid components of the cement, in a range from about 25 wt. % to about 50 wt. %, in a range from about 25 wt. % to about 40 wt. %, or in a range from about 25 wt. % to about 35 wt. %. The glass based cement may contain, for example, an amount of the second glass powder filler material in a range from about 10 wt. % to about 40 wt. % of the total weight of the inorganic solid components of the cement, in a range from about 15 wt. % to about 40 wt. %, in a range from about 20 wt. % to about 35 wt. %.

In one exemplary embodiment, D50 of the first glass powder filler material may be in a range from about 34 μm to about 40 μm, and a median particle size of the second glass powder filler material is in a range from about 190 μm to about 280 μm. In one example, the first glass powder filler material has a D10 of about 6.0 μm, a D50 of about 34.9 μm and a D90 of about 99 μm. In another example, the first glass powder filler material has a D10 of about 6.7 μm, a D50 of about 39.8 μm, and a D90 of about 110.9 μm. In still another example, the first glass powder has a D10 of about 2.7 μm, a D50 of about 13.8 μm and a D90 of about 37.8 μm, and as yet another example, the first glass powder filler material has a D10 of about 2.8 μm, a D50 of about 17.2 μm and a D90 of about 47.9 μm.

The ratio of the second glass powder filler material to the first glass powder filler material may be in a range from about 1:4 to about 1:1, such as about 1:3.5 to about 1:1, from about 1:3 to about 1:1, from about 1:2.5 to about 1:1, from about 1.2 to about 1:1 or from about 1:1.5 to about 1:1. In an exemplary embodiment, the ratio of the second glass powder filler material to the first glass powder filler material is 1:1.

To provide the cement compositions of the present disclosure, the inorganic powders comprising any of the above inorganic powders and any optional inorganic additive components can be mixed together with a suitable organic and/or inorganic binder material. The organic binder material may comprise one or more organic materials, such as a cellulose ether, methylcellulose, ethylcellulose, polyvinyl alcohol, polyethylene oxide and the like, or in some embodiments a gum-like material such as Actigum®, xanthan gum or latex. For example, A4 Methocel is a suitable organic binder. Methocel A4 is a water-soluble methyl cellulose polymer binder available from Dow Chemical. A suitable inorganic binder may comprise colloidal silica or alumina comprising nanometer-scale silica or alumina particles suspended in a suitable liquid, such as water. The inorganic binder material can be present in the cement composition in an amount less than about 10% of the total weight of inorganic solids present in the cement, and in some exemplary embodiments inorganic binders are present in an amount equal to or less than about 5 wt. %, and in certain other exemplary embodiments in a range from about 2 wt. % to about 4 wt. % taking into account the fluid portion of the organic binder (wherein the weight contribution of the fluid portion is removed). A suitable colloidal silica binder material is Ludox HS40 produced by W.R. Grace. Typical colloidal binder materials may comprise approximately 40% by weight solid material as a suspension in a deionized water vehicle.

In some exemplary embodiments, the single and dual glass powder cements described supra may also include an inorganic fibrous reinforcing material. For example, aluminosilicate fibers may be added to the cement mixture to strengthen the honeycomb structure after application of the skin. For example, the cement may include an inorganic fibrous material from about 25 to about 50 wt. % of the total weight of the inorganic solid components of the cement, from about 30 to about 50 wt. %, and in some embodiments from about 35 to about 45 wt. % of the total weight of the inorganic solid components of the cement. In certain other embodiments, fibrous inorganic reinforcing materials may be present in an amount from about 36 wt. % to about 43 wt. % as a percentage of the total weight of the inorganic solids of the cement composition. A suitable inorganic fibrous reinforcing material is Fiberfrax QF 180, available from Unifrax, however, any high aspect ratio refractory particulate could be used.

Typically, the liquid vehicle or solvent for providing a flowable or paste-like consistency has included water, such as deionized (DI) water, although other materials may be used. The liquid vehicle content may be present as a super addition in an amount equal to or less than about 30 wt. % of the inorganic components of the cement mixture, can be in a range from about 10 wt. % to about 25 wt. % of the inorganic components of the cement mixture. However, the liquid vehicle is typically adjusted to obtain a viscosity suitable to make the cement easy to apply.

In some embodiments the cement may optionally further contain organic modifiers, such as adhesion promoters for enhancing adhesion between the cement and the honeycomb body. For example, Michem 4983 has been found suitable for this purpose.

In certain exemplary embodiments, the cement mixture sets at a temperature of less than 1000° C., such as a temperature of less than 800° C., and further such as a temperature of less than 600° C., and yet further such as a temperature of less than 400° C., and still yet further such as a temperature of less than 200° C. In certain exemplary embodiments, the cement mixture is capable of setting at room temperature (i.e., at about 23° C.).

Cement compositions described herein can exhibit viscosities well suited for forming an external skin over a sheet on a honeycomb core. For example, compositions according to the embodiments herein can have an infinite shear viscosity equal to or less than about 12 Pascal-seconds (Pa·s), equal to or less than about 5 Pa·s., or equal to or less than about 4 Pa·s. For a shear rate of 10 s$^{-1}$, the shear viscosity may, for example, be equal to or less than about 400 Pa·s, equal to or less than about 350 Pa·s or less than or equal to about 300 Pa·s. Viscosity was measured using a parallel plate viscometer.

Calcining of cement compositions disclosed herein can be conducted in a box furnace with a linear ramp to 600° C. in 3 hours, followed by a hold for 3 hours at 600° C., then followed by a ramp down to room temperature over a time period of 3 hours. In commercial use, the ceramic article can be wash coated with catalyst followed by a heat treatment to remove organic materials. The ceramic article can also be canned with a mat material that may also require heat treatment to remove organic materials. The calcining process simulates service conditions experienced by the ceramic article.

The composition of the skin cement is not particularly limited and can include, for example, a skin cement of single glass powder compositions, dual glass powder compositions, single glass powder with fibrous reinforcing material compositions, dual glass powder with fibrous reinforcing material compositions, inorganic filler and crystalline inorganic fibrous material compositions, and dual glass powder and crystalline inorganic fibrous material compositions.

EXAMPLES

Figure 4:
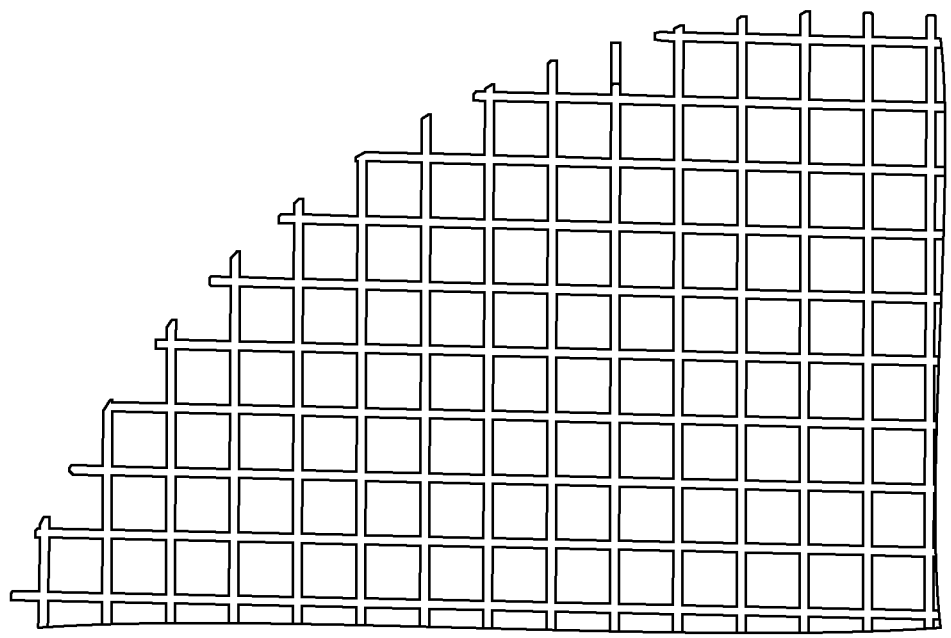
FIG. 4 presents a photograph of a honeycomb core comprising partial cells on an outer periphery thereof in a method according to these exemplary embodiments of the disclosure.

Exemplary embodiments of the disclosure are further described below with respect to certain exemplary and specific embodiments thereof, which are illustrative only and not intended to be limiting. In accordance with some of the embodiments, a 2 in (5 cm) diameter cordierite honeycomb core having 200 cpsi and 12 mil wall (200/12) geometry was prepared. The 2 in (5 cm) honeycomb core was contoured from a 5.7 in (14.5 cm)×6 in (15.3 cm) part. The cordierite honeycomb core is shown in FIG. 4. Partial channels are visible at the outer periphery having an opening or gap as a result of the contouring.

The chemical composition of the skin cement used in the examples is given in Table 1.

TABLE 1

| Skin Material Composition | Grams |
|---|---|
| Coarse fused silica | 50 |
| Fine fused silica | 50 |
| Fiberfrax ® QF 180 | 54 |
| Methocel ™ | 1.1 |

TABLE 1-continued

| Skin Material Composition | Grams |
|---|---|
| Colloidal Silica | 13 |
| Water | sufficient for viscosity consistency |

Comparative Example

Figure 5:
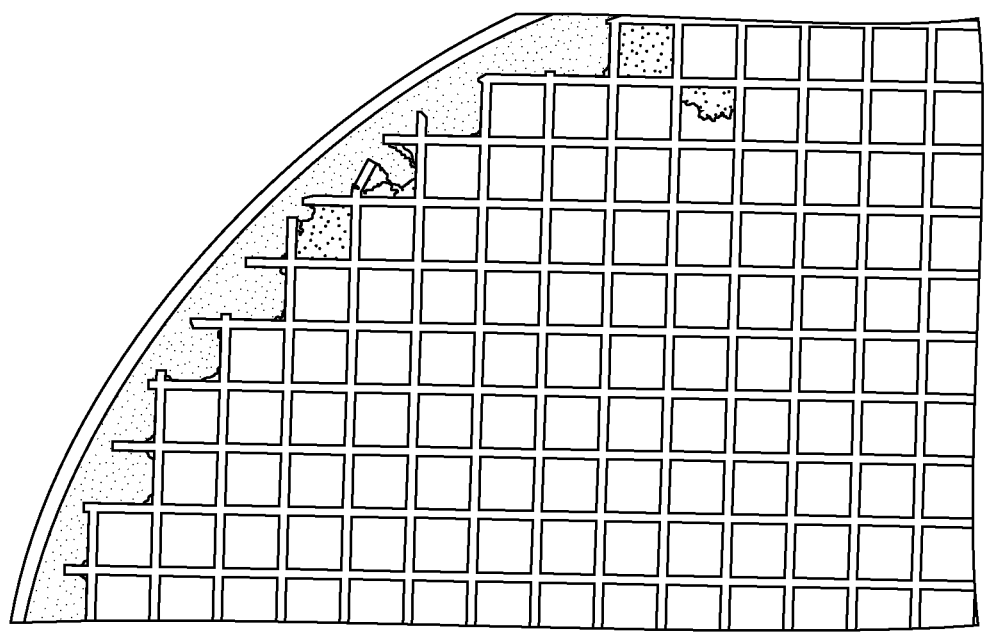
FIG. 5 presents a photograph of a honeycomb body comprising partial cells on an outer periphery thereof filled with skinning material according to a comparative example.

FIG. 5 shows a photograph of a 2 in (5 cm) honeycomb core contoured from a 5.7 in (14.5 cm)×6 in (15.3 cm) part as in FIG. 4 having a skin applied according to a comparative sample. The skinning process in the comparative process, by not using a sheet, fills nearly all of the partial cells. Thus, reducing the open frontal area of the honeycomb body. The blocking of the partial cells can adversely affect pressure drop performance.

Exemplary Embodiments

Figure 6A:
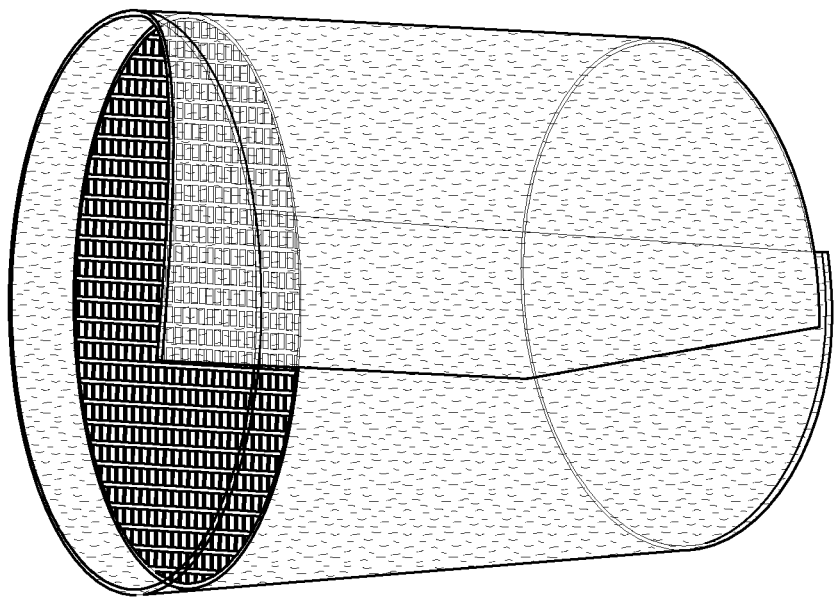
FIG. 6A is a photograph of the honeycomb core comprising partial cells on an outer periphery thereof having a sheet disposed on the outer periphery in a method according to these exemplary embodiments of the disclosure.

FIG. 6A shows a photograph of a 2 in (5 cm) honeycomb core contoured from a 5.7 in (14.5 cm)×6 in (15.3 cm) part as in FIG. 4 having a sheet applied according to exemplary embodiments of the disclosure. The sheet comprises a colloidal alumina slurry treated filter cloth. The filter cloth can prevent skin cement materials entering into the partial cells and the colloidal alumina slurry can act as a binding material of skin cement paste on the honeycomb core to form a honeycomb body. The filter cloth comprises a porous material.

Figure 6B:
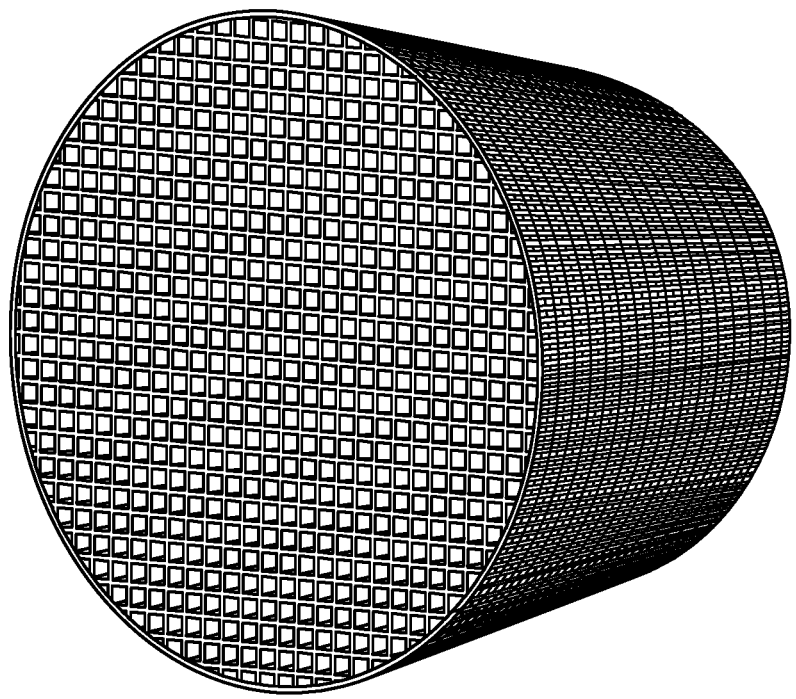
FIG. 6B is a photograph of the honeycomb core comprising partial cells on an outer periphery thereof having a coarse weave sheet disposed on the outer periphery in a method according to these exemplary embodiments of the disclosure.
Figure 6C:
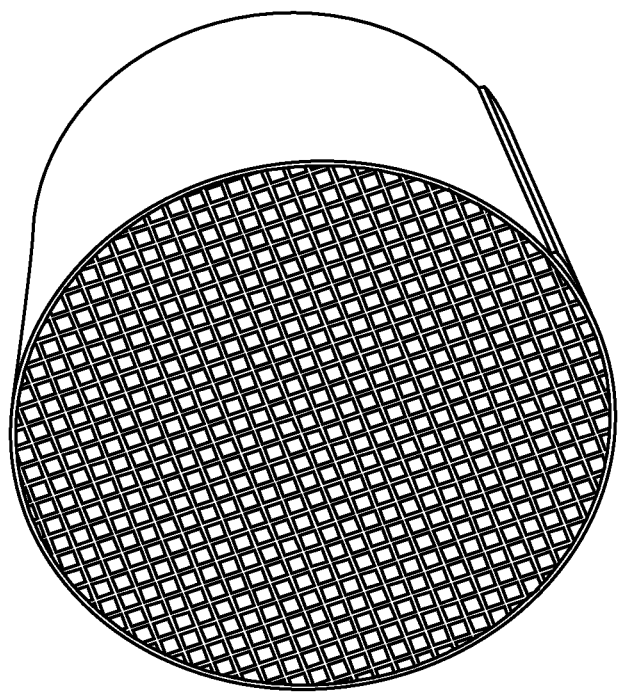
FIG. 6C is a photograph of the honeycomb body of FIG. 6B comprising an applied skin cement material on top of wrapped coarse weave sheet and after drying at 100° C. for 120 minutes not filling partial cells thereof according to exemplary embodiments of the disclosure.
Figure 6D:
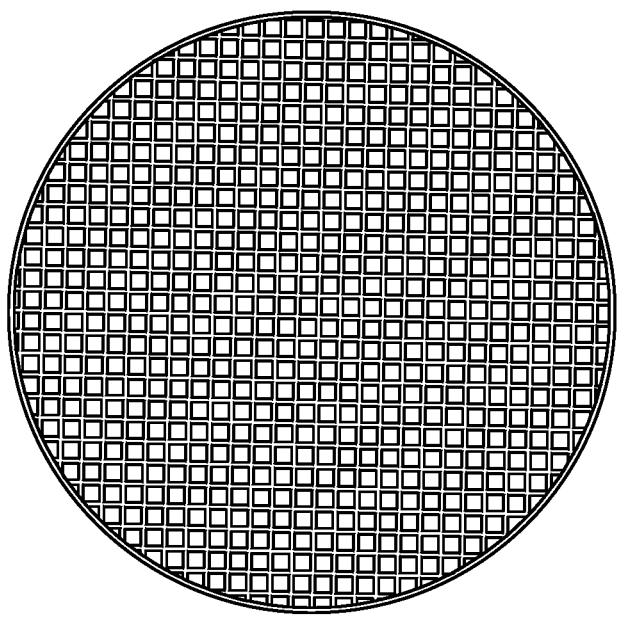
FIG. 6D is a photograph of the honeycomb body of FIG. 6A comprising an applied skin cement material on top of wrapped sheet and after drying at 100° C. for 120 minutes not filling partial cells thereof after firing at 550° C. for 60 minutes according to exemplary embodiments of the disclosure.

FIG. 6B is a photograph of the 2 in (5 cm) honeycomb core contoured from a 5.7 in (14.5 cm)×6 in (15.3 cm) part of FIG. 6A with applied skin cement material on top of wrapped filter cloth and after drying at 100° C. for 120 minutes. The skin cement paste adhered well to the filter cloth. FIG. 6C shows the exemplary sample of FIG. 6B after firing at 550° C. for 60 minutes. The wrapped filter cloth was burned out and the skin cement adhered well to the honeycomb core. FIG. 6D shows the exemplary sample of FIG. 6C after trimming the front face to illustrate the preservation of partial cell channels after skin was applied.

Figure 7A:
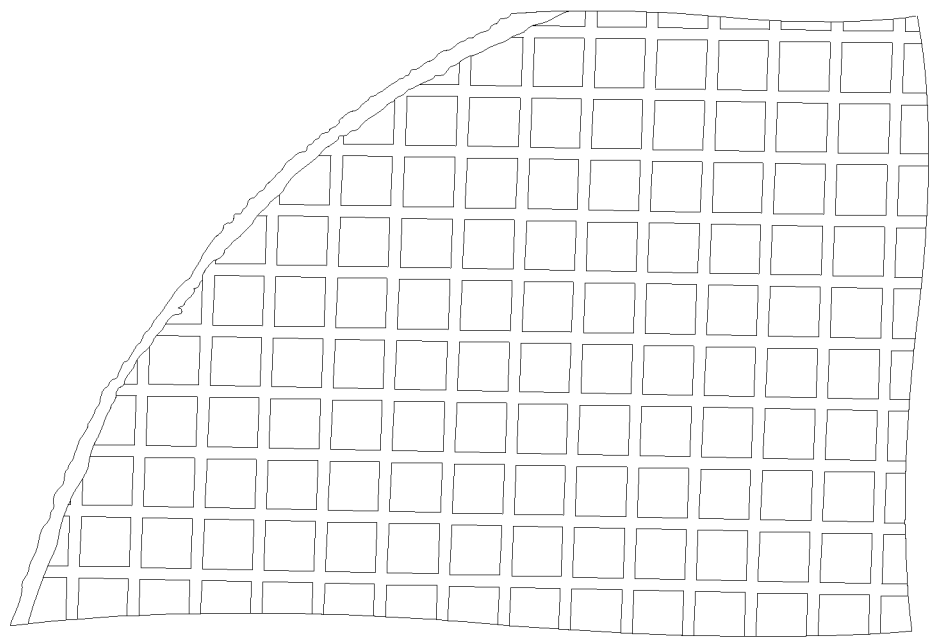
FIG. 7A is a photograph of a honeycomb body comprising a skin on an outer periphery not filling partial cells thereof according to exemplary embodiments of the disclosure.
Figure 7B:
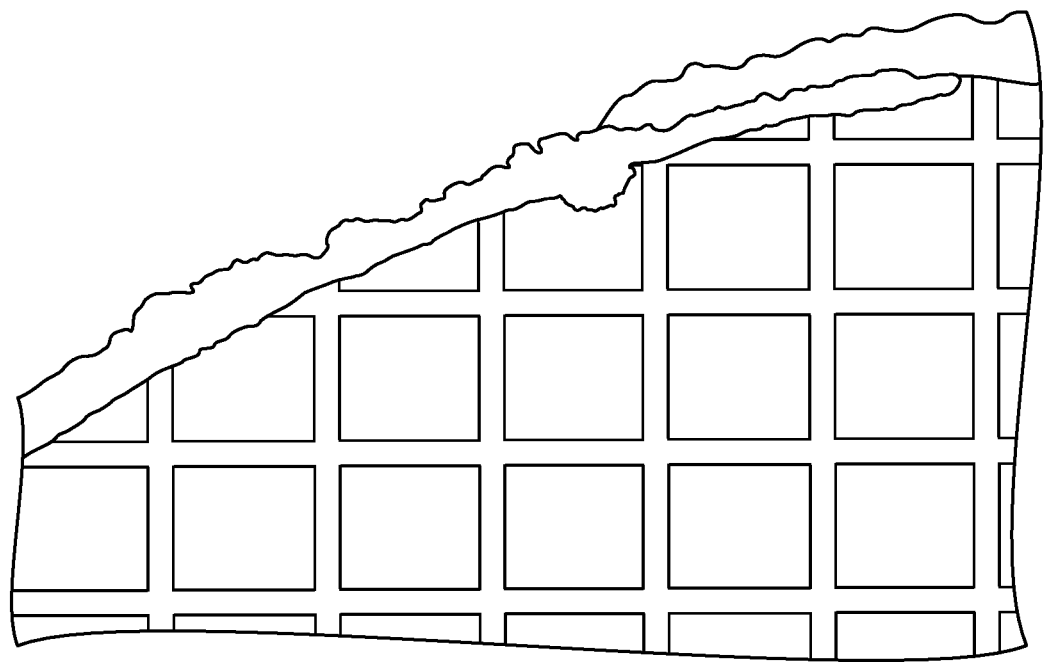
FIG. 7B is a higher magnification photograph of a honeycomb body comprising a skin on an outer periphery not filling partial cells shown in FIG. 7A.

FIG. 7A is a photograph of the honeycomb body of FIG. 6C comprising a skin on an outer periphery not filling partial cells thereof according to exemplary embodiments of the disclosure. FIG. 7B is a higher magnification photograph of a honeycomb body comprising a skin on an outer periphery not filling partial cells shown in FIG. 7A.

Figure 8:
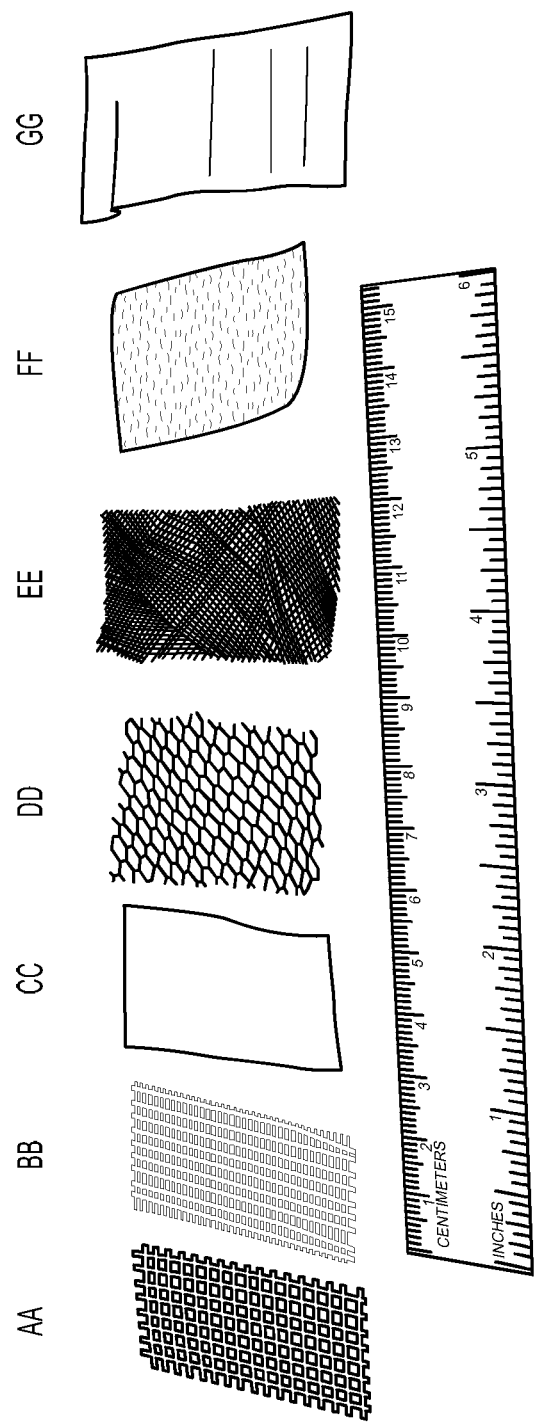
FIG. 8 is a photograph of sheets of various composition, mesh size, and thicknesses according to exemplary embodiments of the disclosure used in skinning methods according to exemplary embodiments of the disclosure.

FIG. 8 is a photograph of sheets of various composition, mesh size, and thicknesses according to exemplary embodiments of the disclosure used in skinning methods according to exemplary embodiments of the disclosure. Example "AA" is a glass fiber screen of small strand spaced about 1020 to 1100 μm having a thickness of about 360 μm. Example "BB" is a glass fiber screen of medium strand spaced about 920 to 1020 μm having a thickness of about 550 μm. Example "CC" is a glass fiber cloth having a thickness of about 190-200 μm and a pore opening size of about 190-335 μm. Example "DD" is a nylon fiber cloth of large hex openings about 3150 μm and having a thickness of about 80 μm. Example "EE" is a nylon fiber cloth of small hex openings about 544 μm and having a thickness of about 180 μm. Example "FF" is a cotton fiber cloth having a thickness of about 250 μm to about 275 μm and Example "GG" is a polyester cloth wipe having a thickness of about 450-500 μm. These thickness measurements were conducted by optical microscope micrometer.

It will be apparent to those skilled in the art that various modifications and variations can be made in the present disclosure without departing from the spirit or scope of the disclosure. Thus, it is intended that the appended claims cover the modifications and variations of this disclosure provided they come within the scope of the appended claims and their equivalents.

The invention claimed is:

1. A method of forming a honeycomb body from a honeycomb core that comprises intersecting walls that form cell channels extending from a first end face to a second end face of the honeycomb core, the method comprising:
   disposing a filling material on an outer peripheral surface of the honeycomb core to fill peripheral partial cell channels at the outer peripheral surface while outer most portions of the intersecting walls of the peripheral partial cell channels are exposed,
   disposing skin batch on the filling material and on the outer most portions of the intersecting walls, wherein the filling material prevents the skin batch from filling the peripheral partial cell channels; and
   curing the skin batch to form a cured skin and to bond the cured skin to the outer most portions of the intersecting walls of the honeycomb core to form the honeycomb body, such that the cured skin forms an outer wall of each of the peripheral partial cell channels,
   wherein curing the skin batch comprises sacrificing at least a portion of the filling material to open each peripheral partial cell channel from the first end face to the second end face.

2. The method of claim 1, wherein disposing the filling material on the outer peripheral surface comprises cleaning away at least some of the filling material in order to expose the outer most portions of the intersecting walls.

3. The method of claim 1, wherein curing the skin batch comprises heating the skin batch.

4. The method of claim 1, wherein curing the skin batch comprises heating the skin batch to a temperature of at least 50° C.

5. The method of claim 1, wherein the filling material comprises a material that is a paste at room temperature and volatizes at a temperature suitable for drying, curing, calcining, or firing.

6. The method of claim 1, wherein the filling material comprises wax or naphthalene.

7. The method of claim 1, further comprising firing and contouring the honeycomb core prior to disposing the filling material on the outer peripheral surface.

8. The method of claim 1, wherein disposing the skin batch on the filling material and on the outer most portions of the intersecting walls comprises at least one of doctor blade skinning and axial skinning.

9. The method of claim 1, wherein the intersecting walls are porous.

10. The method of claim 1, wherein the cured skin comprises a cold set cement.

11. The method of claim 1, wherein the cured skin comprises a fired or sintered ceramic.

12. The method of claim 1, wherein disposing the skin batch on the filling material and on the outer most portions of the intersecting walls comprises disposing multiple layers of skin batch.

13. The method of claim 12, wherein the multiple layers comprise different compositions.

14. The method of claim 1, wherein the skin batch comprises an inorganic fibrous reinforcing material.

* * * * *

UNITED STATES PATENT AND TRADEMARK OFFICE
CERTIFICATE OF CORRECTION

| | |
|---|---|
| PATENT NO. | : 11,220,466 B2 |
| APPLICATION NO. | : 17/071652 |
| DATED | : January 11, 2022 |
| INVENTOR(S) | : Natarajan Gunasekaran et al. |

It is certified that error appears in the above-identified patent and that said Letters Patent is hereby corrected as shown below:

In the Specification

In Column 1, Line 5, delete "Now" and insert -- now --.

Signed and Sealed this
First Day of August, 2023

Katherine Kelly Vidal
*Director of the United States Patent and Trademark Office*